United States Patent [19]

Fiet

[11] 3,726,128
[45] Apr. 10, 1973

[54] DENSITY MEASURING INSTRUMENT HAVING ELECTROMAGNETIC SUSPENSION WITH A VARIABLE SPRING CONSTANT

[75] Inventor: Owen Orlando Fiet, Redondo Beach, Calif.

[73] Assignee: TRW Inc., Redondo Beach, Calif.

[22] Filed: Mar. 29, 1971

[21] Appl. No.: 129,030

[52] U.S. Cl. .............................73/30, 73/453, 73/32
[51] Int. Cl. .................................................G01n 9/20
[58] Field of Search.....................73/19, 30, 453, 32, 73/516 R; 308/10; 219/7.5; 310/166

[56] References Cited

UNITED STATES PATENTS

| 3,581,556 | 6/1971 | Salvinski et al. | 73/453 |
| 2,524,600 | 10/1950 | Raymond et al. | 73/453 |
| 2,856,240 | 10/1958 | Breazezle et al. | 308/10 |
| 2,981,111 | 4/1961 | McIlwraith et al. | 73/453 |

Primary Examiner—Richard C. Queisser
Assistant Examiner—C. E. Snee, III
Attorney—Daniel T. Anderson, William B. Leach and Donald W. Graves

[57] ABSTRACT

An electric coil is provided for the purpose of carrying alternating current. An electrically conducting sphere placed within the magnetic field of the coil incurs eddy currents resulting in magnetic repulsion between the sphere and the coil which is maintained at a null position by means of an autoregulation or feedback circuit. Voltage or current applied to the coil to maintain the sphere at a null position is an indication of the buoyant forces acting upon the sphere and thus is representative of the density of the gas or liquid surrounding the sphere. The coil and sphere are enclosed in a magnetic enclosure to provide a flux path and the top plate of the enclosure is provided with an opening of a size selected to alter the magnetic field of the coil and thereby the equivalent spring constant of the system.

7 Claims, 4 Drawing Figures

PATENTED APR 10 1973 3,726,128

Owen Orlando Fiet
*INVENTOR.*

BY *William B. Leach*
ATTORNEY

DENSITY MEASURING INSTRUMENT HAVING ELECTROMAGNETIC SUSPENSION WITH A VARIABLE SPRING CONSTANT

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The present invention relates in general to levitation devices and more specifically to density measuring instruments which sense buoyant forces on a buoyant member suspended by electromagnetic means.

It is well known that the force acting on a body immersed in a fluid is a function of the density of the fluid and of the volume of fluid displaced by the body. Thus, if the volume of the body is maintained constant and if the buoyant forces acting upon the body can be measured then the density of the fluid may be determined. Many density measuring systems have been devised in which a body having magnetic properties is suspended within a magnetic field produced by electromagnets. Such systems often include an electrical feedback circuit and a position sensing network which cooperate to maintain the buoyant member at a null position while under the influence of buoyant forces and in which an applied voltage or current is representative of the buoyant forces and thus the density of the fluid in question. Such a system may be found in the U.S. Pat. to McIlwraith et al., No. 2,981,111. A system such as shown therein utilizes direct current differential electromagnetic suspension which requires that the suspended element have magnetic properties. All available magnetic properties have magnetic hysteresis which could cause hysteresis errors in the indicated force readout. Errors of this magnitude may often be ignored, however, in systems which are used under vacuum conditions or for laboratory instruments which are to be used as standard reference devices it is desirable to eliminate or minimize as many sources of error as possible. The hysteresis error can be greatly reduced or avoided by eliminating the use of magnetic material in the suspended or buoyant element. An induction repulsion electromagnetic suspension system can avoid the use of suspended magnetic materials and of solid material connections to the suspended element.

The principles of electromagnetic levitation by eddy currents have heretofore been used to suspend an electrical conductor in the magnetic field produced by an alternating current in an electrical coil. In such cases it has been common to suspend the element either above or below the coil and in some cases to add an extra coil to obtain lateral stability of the suspended element. The stabilizing coil is connected in series with the suspending coil. One of the few applications of this method of suspension is the radio-frequency levitation melting of metals. The speciman of metal is both melted and maintained in suspension to eliminate contamination of the melt by contact with crucibles. Such a system is described in the U.S. Pat. to Wroughton, et al., No. 2,686,864 (1954).

The principles of levitation have also found application in maintaining a floated gyroscope centered within a frame as discussed in the U.S. Pat. to Anschutz-Kaempfe, No. 1,589,039 (1926).

It is accordingly an object of the present invention to provide a density measuring instrument which is not subject to these and other disadvantages and limitations of the prior art.

It is another object of the present invention to provide a density measuring instrument capable of measuring the density of gases which are at partial vacuum or substantially total vacuum pressures.

A further object of the present invention is to provide a density measuring instrument which, in part, immerses a buoyant member in the fluid whose density is to be measured and in which the buoyant member does not include magnetic materials.

It is yet another object of the present invention to provide a density measuring instrument in which the effective spring constant of the system may be varied.

SUMMARY OF THE INVENTION

The present invention provides a device for measuring the density of a fluid either liquid or gas. The device uses electromagnetic levitation by means of eddy currents to suspend an electrically conducting element within an electrical coil which carries alternating current. A housing having high magnetic permeability serves to concentrate a magnetic field around the suspended element and may also serve as a housing for confining the fluid whose density is to be measured.

A position sensing means is provided to determine the location of the suspended element along the vertical axis and to provide an electrical signal representative of the deviation of the suspended element from preselected position referred to as a null position. An optical system or a bridge circuit will serve this purpose. The deviation signal then is incorporated into a feedback circuit to regulate the alternating current supplied to the suspension coil so as to maintain the suspended element substantially at the null position. The current or voltage is then representative of the density of the fluid in which the suspended element is immersed. The accuracy of the system will be enhanced if the feedback circuit utilizes a phase lock loop.

An opening is provided in the upper wall of the housing thereby decreasing the permeability of the flux path in the region above the suspended element. If the space between the suspended element and the housing is relatively small, the opening in the top wall of the housing can be made sufficiently large so as to make the net repulsive forces on the suspended element to act in an upward direction. The effective spring constant of the system will also be affected thereby.

DESCRIPTION OF THE PREFERRED EMBODIMENT

Figure 1:
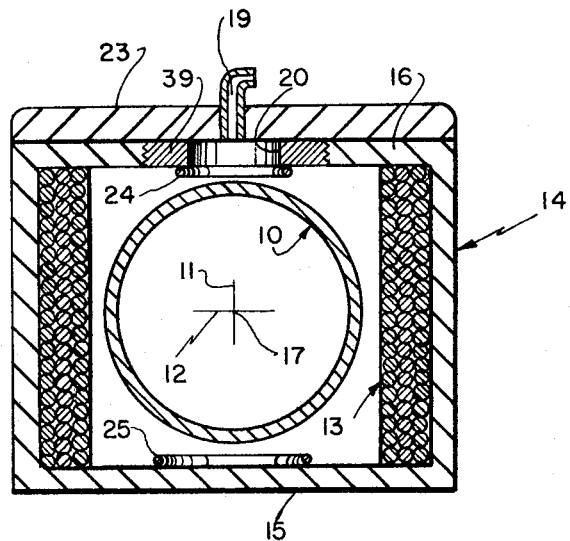
FIG. 1 is a diagram in cross-section representing a density measuring instrument in accordance with the principles of the present invention.

Referring to FIG. 1 there is depicted a suspended element 10 or buoyant member which is shown in the form of a hollow thin walled sphere and which is constructed of any non-magnetic electrically conducting material such as aluminum. For purposes of discussion there is also shown a vertical axis 11 and a horizontal axis 12 which intersect at the midpoint of the physical system and which may coincide with the null position referred to below. FIG. 1 also shows an electrical suspension coil 13 substantially in the shape of a cylinder and having its axis coinciding with the vertical axis 11. The sphere 10 and the suspension coil 13 are enclosed within a magnetic housing 14 or core which is substantially in the shape of a closed end cylinder having end walls 15 and 16 and may be of any material having high magnetic permeability, and high electrical resistivity.

If an alternating current is carried by the suspension coil 13 it is clear that eddy currents will be induced in the conductive member 10. It is also apparent that the current carrying suspension coil 13 will have a magnetic field associated therewith and that the eddy currents in the suspended element 10 will also have a magnetic field associated with it. These two magnetic fields are always in opposition to one another and thus there result repulsive forces between the two fields. If the suspended element 10 is positioned exactly at the mid point 17 of the suspension coil as defined by the intersection of the vertical axis 11 and horizontal axis 12, then there will be forces acting downward on the upper portion of the sphere 10 and forces acting upward on the lower portion of the sphere 10 and the sphere would be in exact equilibrium.

Figure 2:
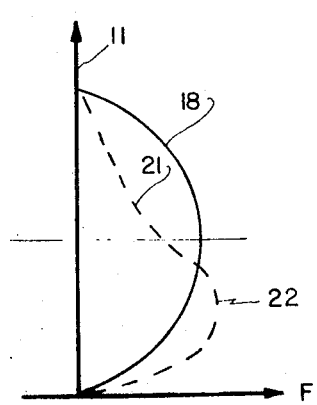
FIG. 2 is a graphical representation of the electromagnetic forces acting on the suspended element.
Figure 3:
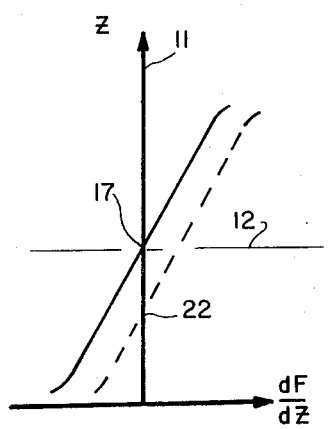
FIG. 3 is a graphical representation of the force gradient taken along the vertical axis of the suspended element.

This condition is represented in FIG. 2 wherein the forces F acting on the sphere 10 are plotted along the vertical axis 11 and are represented by the curve 18. As heretofore indicated there is a symmetry of forces above and below the horizontal axis 12 and that those forces are in exact opposition. The gradient of these forces along the vertical axis is shown in FIG. 3 wherein the vertical axis 11 is further represented by the letter Z. It is noted that the gradient $dF/dZ$ is zero at the mid point 17 and has symmetry above and below that point.

The system as thus far described is unstable in that if the sphere 10 is disturbed from its point of equilibrium the forces acting on the sphere will have a resultant force in the direction of the disturbance. Upward disturbing forces will be present from buoyant forces and downward disturbing forces are present from the effects of gravity. To overcome the foregoing, and as shown in FIG. 1, there is an opening 20 provided in the upper wall 16 of the housing 14. This opening serves to disrupt the high permeability path provided by the housing 14 and to disrupt the flux pattern of the magnetic field produced by the alternating current and thereby redistribute the forces acting upon the sphere 10. The redistribution of forces is represented in FIG. 2 by the curve 21 which is intended merely to show the relative changes in forces and is not intended to be shown to scale. Since the flux field has been weakened above the sphere, the forces acting on the lower portion of the sphere will be the strongest and the maximum force acting on the sphere will occur somewhat below the horizontal axis 12 and the net or resultant repulsive force will be upward. As shown in FIG. 3, the zero gradient point has now moved somewhat below the horizontal axis 12 to a new point such as indicated at 22. If there is no current in the suspension coil 13 of FIG. 1 the sphere 10 will of course drop and rest against the bottom wall 15 of the housing 14. The center of the sphere will then be at some point below the horizontal axis 12 and it is necessary that under those conditions the center of the sphere be located at some point above the zero gradient position 22 shown in FIG. 3.

Under these conditions, when an alternating current is passed through the suspension coil 13 there will always be a resulted upward force acting upon the sphere. Thus, if the sphere drops below the horizontal axis 12 the suspension coil current may be increased to return the sphere to the mid point or null position and if buoyant forces cause the sphere to rise above the horizontal axis 12 the suspension coil current may be decreased to thereby return the sphere to the mid point. The magnetic housing 14 is preferably constructed with rotational symmetry about the coil axis, but may be constructed of segments rather than of continuous construction as shown in the drawings.

Since the instrument may be used to measure the density of a gas as well as a liquid, there is a cover plate 23 provided to seal the opening 20 in the upper wall 16 of housing 14. This cover plate may be of any non-magnetic material and may include a passageway 19 through which the fluid whose density is to be analyzed may be admitted to the interior chamber of the housing 14. In many applications such as those involving vacuum conditions, the instrument absent the cover may be placed within a vacuum chamber.

Figure 4:
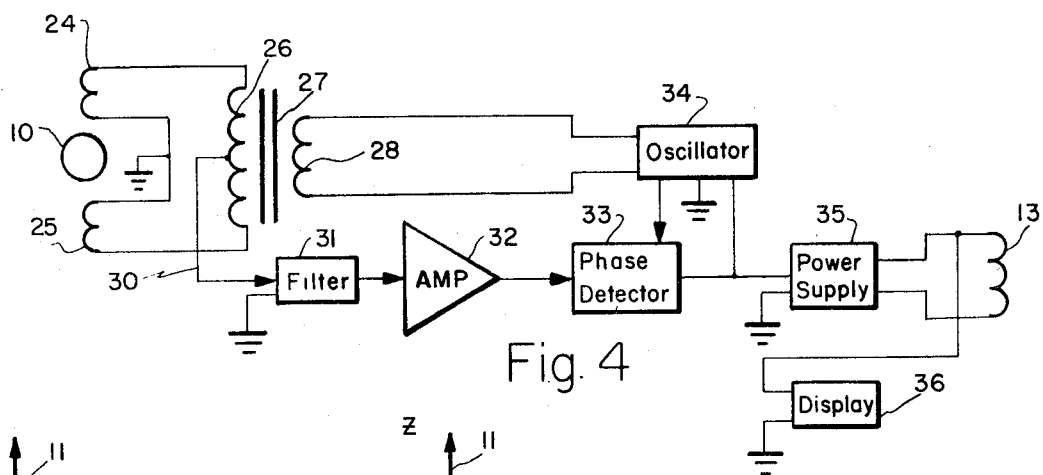
FIG. 4 is a diagram representing an electrical circuit suitable for the practice of the present invention.

In order to provide a mechanism for determining the position of the sphere 10 with respect to the horizontal axis 12 there is included in the instrument an upper electrical coil 24 and a lower electrical coil 25. These two coils are shown in FIG. 4 along with the remainder of the electrical feedback network. Each of the coils 24, 25 form a leg of an inductance bridge network which also includes coil 26. The bridge is excited through the transformer action of core 27 and primary coil 28. The output of the bridge is taken across the output lead 30 and ground and the output signal will vary as a function of the position of the sphere 10 between the upper and lower coils.

In order to minimize the influence of electrical noise on the accuracy of the system, the bridge output signal is impressed upon a filter network 31 which passes a very narrow band of selected frequencies providing an output which is impressed upon a high gain amplifier 32. The filter is selected in accordance with criteria well known in the art to satisfy stability requirements of a closed loop control system as well as to minimize noise modulation within the system. For the purposes of detecting very small buoyant forces, it is desirable to have minimal restoring and suspension forces acting upon the sphere 10 and at the same time to have only small disturbances in the position of the sphere 10 result in immediate restoration of the sphere to its null position. Thus, it is desirable to have a high gain amplifier, preferably having a gain in the order of 1 million to one.

As also shown in FIG. 4 the output of amplifier 32 is impressed upon a phase detector 33 which compares the phase relationship between the amplifier output signal and the alternating current bridge signal produced by an oscillator 34. The output of phase detector 33 is impressed upon the oscillator 34 which is used within the oscillator circuitry to continually adjust the oscillator output frequency to the preselected value which will be efficiently passed by the filter network 31. In other words, since the oscillator frequency and the band pass characteristics of the filter may incur some small drift from the design point, it is desirable, and necessary for a very narrow band pass, to have the oscillator frequency continually adjusted to remain within the selected band. The phase detector output amplitude is used to regulate a power amplifier 35 which in turn supplies alternating current to the suspension coil 13. Thus, the alternating current may be continuously regulated and varied to always return the sphere 10 to its preselected null position. The output amplitude of phase detector 33 is also indicative of the alternating current level required to maintain the sphere 10 at its null position and is thus impressed upon display unit 36 which may be devised and calibrated to provide a visual and/or printed record of the fluid density.

A variation of the foregoing instrument is included in FIG. 1 wherein the upper wall 16 of the housing 14 includes a threaded insert 39 in which the opening 20 is provided. Several inserts each having an opening of a diameter differing from one another provide an easy means for varying the opening in the upper wall to thereby vary the spring constant of the system. Other such means may be devised to serve this purpose such as an iris type adjustment.

It will be apparent to those in the art that various techniques may be employed to sense the position of the sphere 10 including optic systems in which the sphere interrupts or reflects varying amounts of light to provide a deviation signal representative of the sphere position. Also applicable are inductance, resistive, or capacitance bridge networks, or combination thereof.

The instrument as described and claimed lends itself to rugged construction and is thus suitable for remote density sensing applications such as required in the field of oceanography. The principles of the invention also are applicable to a variety of power supply conditions including the commonly found 60 cycle supply and to 400 cycle supplies found in some fields of applications.

What is claimed is:

1. An instrument for measuring density of a fluid comprising:
   a. a vertically aligned cylindrical electrical suspension coil;
   b. a magnetic core enclosing said coil and having a single opening located in the upper wall thereof;
   c. an electrically conducting buoyant member to be immersed in the fluid and positioned within said coil and said core, the opening in the upper wall of said magnetic core being in the region axially above said buoyant member and selectively sized so as to provide upwardly directed expulsive forces on said buoyant member for all positions of said buoyant member within said core and coil whenever alternating current is applied to said coil;
   d. sensing means coupled to said buoyant member for detecting a deviation of said member from a null position and for producing a deviation signal representative thereof; and
   e. a feedback circuit responsive to the deviation signal and coupled to said coil for producing an alternative coil current which tends to return said buoyant member toward its null position whereby the coil current or applied voltage is representative of the buoyant force on said member.

2. The instrument of claim 1 wherein said buoyant member is spherically shaped.

3. The instrument of claim 1 wherein said buoyant member is hollow.

4. The instrument of claim 1 wherein said buoyant member is a hollow sphere.

5. The instrument of claim 1 further comprising means associated with said magnetic core for varying the size of the opening therein.

6. The instrument of claim 1 wherein said feedback circuit includes:
   a. a narrow band filter having the deviation signal impressed thereon;
   b. a high gain amplifier having its input coupled to the output of said filter; and
   c. a power amplifier for supplying alternating current having its input coupled to the output of said high gain amplifier and the output coupled to said suspension coil and providing current to said suspension coil in response to the deviation signal.

7. The instrument of claim 6 further including:
   a. an electrically controlled oscillator having its output coupled to said sensing means; and
   b. a phase detector coupled between said high gain amplifier and said power amplifier and further coupled to said oscillator, said detector including means for comparing the phase difference between the high gain amplifier output signal and the oscillator output signal and for providing a phase signal representative thereof, said oscillator being responsive to the phase signal to maintain the oscillator output frequency within the frequency band pass of said filter.

* * * * *